(12) United States Patent
Hazan

(10) Patent No.: US 9,703,970 B2
(45) Date of Patent: Jul. 11, 2017

(54) SYSTEM AND METHODS THEREOF FOR DETECTION OF CONTENT SERVERS, CACHING POPULAR CONTENT THEREIN, AND PROVIDING SUPPORT FOR PROPER AUTHENTICATION

(71) Applicant: Qwilt, Inc., Redwood City, CA (US)

(72) Inventor: Gaash Hazan, Kfra Saba (IL)

(73) Assignee: Qwilt, Inc., Redwood City, CA (US)

( * ) Notice: Subject to any disclaimer, the term of this patent is extended or adjusted under 35 U.S.C. 154(b) by 0 days.

(21) Appl. No.: 13/838,506

(22) Filed: Mar. 15, 2013

(65) Prior Publication Data

US 2013/0212708 A1  Aug. 15, 2013

Related U.S. Application Data

(63) Continuation-in-part of application No. 13/006,785, filed on Jan. 14, 2011.

(60) Provisional application No. 61/375,836, filed on Aug. 22, 2010, provisional application No. 61/722,205, filed on Nov. 4, 2012.

(51) Int. Cl.
*G06F 15/173* (2006.01)
*G06F 21/62* (2013.01)
*H04L 29/08* (2006.01)
*G06F 21/10* (2013.01)

(52) U.S. Cl.
CPC ............. *G06F 21/62* (2013.01); *G06F 21/10* (2013.01); *H04L 29/08729* (2013.01); *H04L 67/1095* (2013.01)

(58) Field of Classification Search
CPC ......... H04L 29/08729; H04L 29/08774; H04L 29/0881; H04L 29/08891; H04L 67/1095; H04L 67/1097; H04L 67/2847; H04L 67/2842; H04L 67/2852
USPC .......... 340/1.1–16.1; 370/252; 709/223, 224; 714/39, 47.1–47.3, 1.1–16.1
See application file for complete search history.

(56) References Cited

U.S. PATENT DOCUMENTS

| 5,933,603 | A | 8/1999 | Vahalia et al. |
| 6,049,530 | A | 4/2000 | Petersen et al. |
| 6,363,413 | B2 | 3/2002 | Kidder |
| 6,700,889 | B1 | 3/2004 | Nun |

(Continued)

OTHER PUBLICATIONS

Non-final Office Action dated Sep. 25, 2012 in U.S. Appl. No. 13/006,785.

(Continued)

*Primary Examiner* — Davoud Zand
(74) *Attorney, Agent, or Firm* — Sughrue Mion, PLLC

(57) ABSTRACT

An apparatus and methods thereof provide for efficient usage of network bandwidth and ability to identify whether a client is authorized to receive such bandwidth. Content provided by a content source for a first content consumer is stored in the apparatus located in between the content source and the content consumer allowing delivery of such content to another content consumer from the apparatus thereby reducing the overall network load. For protected content, the apparatus identifies the need for authorization and provides a random identification to the target content consumer and storing that random identification as well as at least another parameter associated thereto such that when revalidation is necessary the content consumer can be validated by the apparatus.

16 Claims, 6 Drawing Sheets

(56) References Cited

U.S. PATENT DOCUMENTS

| | | |
|---|---|---|
| 6,772,193 B1 | 8/2004 | Igawa et al. |
| 6,831,893 B1 | 12/2004 | Ben Nun et al. |
| 7,281,260 B2 | 10/2007 | Puente et al. |
| 7,310,480 B2 | 12/2007 | Maciocco et al. |
| 7,436,830 B2 | 10/2008 | Ben-Nun et al. |
| 7,606,314 B2 | 10/2009 | Coleman et al. |
| 7,719,966 B2 | 5/2010 | Luft et al. |
| 2002/0006124 A1 | 1/2002 | Jimenez et al. |
| 2002/0062372 A1* | 5/2002 | Hong et al. .................. 709/225 |
| 2006/0129697 A1 | 6/2006 | Vange et al. |
| 2006/0271972 A1 | 11/2006 | Pai et al. |
| 2007/0124781 A1 | 5/2007 | Casey et al. |
| 2009/0083279 A1 | 3/2009 | Hasek |
| 2009/0307757 A1* | 12/2009 | Groten .............................. 726/4 |
| 2009/0313437 A1 | 12/2009 | Sofman et al. |
| 2010/0054257 A1 | 3/2010 | Dolganow et al. |
| 2010/0082774 A1 | 4/2010 | Pitts |
| 2011/0141887 A1 | 6/2011 | Klein et al. |
| 2011/0153937 A1 | 6/2011 | Annamalaisami et al. |
| 2012/0011271 A1* | 1/2012 | Zhao et al. .................. 709/234 |
| 2012/0030212 A1 | 2/2012 | Koopmans et al. |
| 2012/0047224 A1 | 2/2012 | Shemesh et al. |

OTHER PUBLICATIONS

Non-final Office Action dated Jul. 26, 2012 in U.S. Appl. No. 13/006,875.

\* cited by examiner

SYSTEM AND METHODS THEREOF FOR DETECTION OF CONTENT SERVERS, CACHING POPULAR CONTENT THEREIN, AND PROVIDING SUPPORT FOR PROPER AUTHENTICATION

CROSS-REFERENCE TO RELATED APPLICATION

This application claims priority from U.S. provisional patent application No. 61/722,205, entitled "A System and Methods Thereof for Detection of Content Servers, Caching Popular Content Therein, and Providing Support for Proper Authentication", filed on 4 Nov. 2012, and this application is a continuation-in-part of U.S. patent application Ser. No. 13/006,785 entitled "A System for Detection of Content Servers and Caching Popular Content Therein", filed on 14 Jan. 2011, which claims priority from U.S. provisional patent application 61/375,836, entitled "A System for Detection of Content Servers and Caching Popular Content Therein", filed on 22 Aug. 2010, all of the above-identified applications assigned to a common assignee and all of the above-identified applications are hereby incorporated by reference in their entirety.

TECHNICAL FIELD

The disclosed teaching generally relates to classification of packets transmitted in a network, more specifically to the determination of content to be stored in storage located along the network based on the type of data transferred in the packet, and even more specifically to ensuring proper handling of content requiring use authorization.

BACKGROUND

Service providers worldwide are facing a mounting problem of flattening revenues coupled with increasing costs brought forth by increasing usage of bandwidth, growing churn, subscriber saturation and competitive price pressures. These mobile and broadband providers are facing challenges in delivering new revenue generating services while seeing their over the top (OTT) counterparts reaping rewards with content delivered over the networks they built and maintained over the years.

The vast majority of these OTT services are delivered over hypertext transfer protocol (HTTP), the de-facto protocol for application development and delivery. Be it video, social networking, search, or advertising, over fixed line as well as mobile applications, it is most likely running on top of HTTP. However, this protocol is also the most processing intensive protocol for network devices. Hence practically any increase in usage results in an increase in the pressure on the service providers.

Certainly one way to control traffic on the Internet requires various levels of understanding of the traffic that flows through the network which is also increasing in its level of sophistication. Various systems and solutions have been offered to enable deep-packet-inspection (DPI) to enable an ever sophisticated ability to shape the traffic on the network. This ability allows the service providers to better manage the network and its related resources, provide a higher level of quality of service (QoS) in the hopes to increase revenues and profits. However, the rapid increase in the delivery of heavy bandwidth consuming data, such as video, and consumption thereof, requires a new level of handling that is not available today in prior art solutions. A known problem is the access of a user node to a content source and subsequently the access by another user node to the same content, resulting in additional load on the content provider and on the entire network. When, for example, popular video clips are accessed there is a significant and noticeable degradation of the network performance that may even lead to a network failure. Some prior art solutions attempt to store all the data in caches, however, with the huge amounts of data and the need to inspect each and every packet, regardless of its source, makes this a daunting and impractical task.

It would be advantageous to provide service providers with a solution that will enable them to effectively manage and control the delivery of heavy bandwidth consuming data such that the overall bandwidth requirements are loaded and better shared across the network in general, and in particular within the network of a specific service provider.

SUMMARY

According to an aspect of the present invention, there is provided an apparatus including a network interface, a deep inspection (DPI) unit, a storage, and a content delivery unit. The DPI unit identifies at least a source of content and inspects one or more packets provided from the identified at least a source of content, each packet having at least a specific source address and a specific destination address. The storage stores at least a portion of the content for a predetermined time period. The content delivery unit is configured to: identify a request from a client for content from the identified at least a source of content, determine whether the content requires an access authorization by the identified at least a source of content, receive an authorization from the at least a source of content, generate a random identification (ID) associated uniquely with the client, provide at least the random ID to the client, and store in a table the random ID and at least another parameter associated with the random ID.

The apparatus can use the network interface to connect to a network in one of: a 'bump-in-the-wire' mode and a sniffing mode.

The apparatus can provide data from the storage to the client from a dedicated network port.

The parameters associated with the random ID can be at least one of: an identifier of the content, a name of the content, a description of the content, an expiration time, a start time, a received token, and a client identifier.

The expiration time can be periodically checked by the content delivery unit and when the expiration time has elapsed, the content delivery unit removes from the table an entry associated with the random ID having an expired time.

The expiration time can be periodically extended in response to continued requests from the client for content from the identified at least a source of content.

The content can be one of: a video stream, a video clip, an audio stream, an audio clip, a video frame, combinations thereof, and any portion thereof.

The content delivery unit can, responsive to receiving a client random ID from the client, verify that the client random ID exists in the table and if the client random ID does not exist in the able, the content delivery unit can decline to provide content from the apparatus to the client.

The content delivery unit can, upon validating the existence of the client random ID in the table, validate at least one parameter associated with the random ID, and upon failure to pass validation of the at least one parameter, the content delivery unit can decline to provide content from the apparatus to the client.

Additional aspects of the present invention can be provided by way of a method implementing the operations of the apparatus and a computer readable medium storing a program for executing the functions carried out by the apparatus.

BRIEF DESCRIPTION OF THE DRAWINGS

The above discussed advantages of the disclosed teachings will become more apparent by describing in detail some exemplary implementations thereof with reference to the attached drawings in which.

DETAILED DESCRIPTION

Techniques for efficient usage of network bandwidth are disclosed. Specifically, the disclosed system samples packets from a plurality of content sources and identifies those content sources providing predetermined types of data, for example, video clips. Upon identification of such content sources, any data that arrives from such a content source is subject to a deep-packet-inspection (DPI) process to positively identify the content and the need to store it in cache storage such that when a subsequent request for the same content is received there is no need to transmit the content from the content source and rather deliver it from the system's storage. This results in at least less traffic passing on the entire network, faster service, and lower operational costs. Furthermore, it is recognized that even though content is delivered from the apparatus, in certain cases, to ensure proper operation it is necessary to properly authorize the client receiving such content. Therefore, upon receipt of a request for a content, or a portion thereof, from a client the apparatus inspects whether the client is authorized to receive the requested content and if necessary, implements one or more validation techniques for the client with respect to the apparatus and with respect to the server providing the content originally. A preferably random identifier (ID) may be used in conjunction with the requested content. When a subsequent request for the content is received from the authorized client, the requested content can be delivered directly from the apparatus' storage unit. The content includes various types of data, including but not limited to, a video stream, a video clip, an audio stream, an audio clip, a video frame, combinations thereof, and portions thereof.

Figure 1:
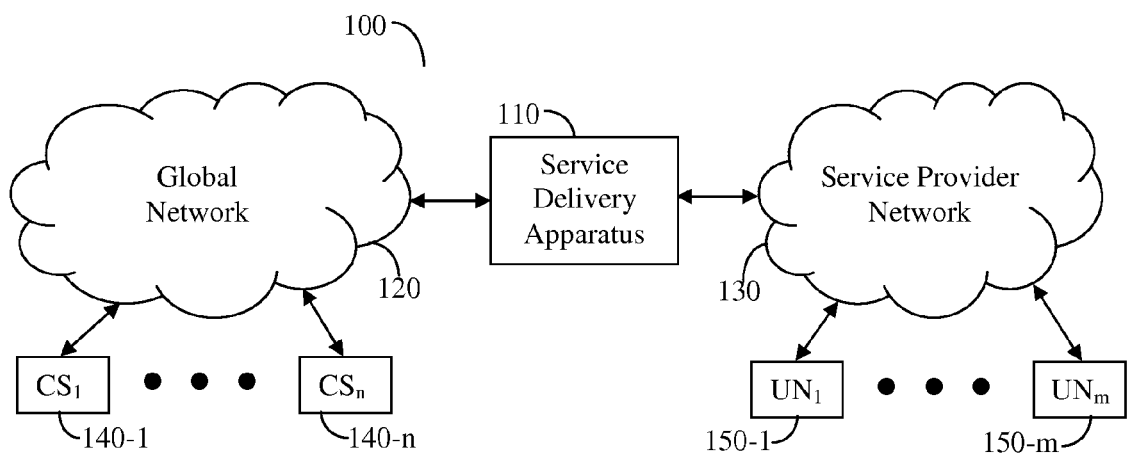
FIG. 1 is a block diagram of an exemplary network system in accordance with certain aspects of the disclosed teachings.

Reference is now made to FIG. 1 where an exemplary and non-limiting block diagram 100 of a basic network system in accordance with the disclosed teachings is shown. The system depicted comprises a first portion of a network and a second portion of the network. In this example, the first portion of the network is a global network 120 and the second portion of the network is a service provider network 130. The first and the second portion of the network are coupled in one embodiment by a 'bump-in-the-wire' service delivery apparatus (SDA) 110 (hereinafter referred to as apparatus 110 or SDA 110). Alternatively, the SDA 110 connects to the network (including the global network 120 and the service provider network 130) in a sniffing mode. A sniffing mode is achieved, for example but not by way of limitation, by connecting to a network in a non-intrusive manner, that is, the device can "listen" to the traffic flowing over the network without interfering with its flow. While the network 120 and 130 are shown as detached from each other it should be noted that this is only an exemplary configuration and other configurations are possible without departing from the principles of the disclosed teachings and such separation may be, for example, merely a logical separation. However, this should not be viewed as limiting upon the disclosed teachings and the apparatus 110 as well as the teachings herein equally apply to the case where the apparatus 110 receives a copy of the traffic and therefore no physical separation of the networks 120 and 130 takes place. Rather, apparatus 110 uses another port to provide the data therefrom. To the global network 120, there are connected one or more content sources (CSs), shown as $CS_1$ 140-1 through $CS_n$ 140-n, commonly referred to as CS 140. The content sources provide content upon request, for example video clips, from the appropriate CS to a requestor. To the service provider network 130 there are connected one or more user nodes (UNs), shown as $UN_1$ 150-1 through $UN_m$ 150-m, commonly referred to as UN 150. When a UN 150 requests content from a CS 140, it is transferred according to the disclosed teachings through the SDA 110, the function of which is described in more detail herein below. Generally, the SDA 110 may provide the requested content from its storage or, when such content, or portions thereof, are not in the SDA 110, then the request is forwarded to the appropriate CS 140 for the delivery of the content, as further described below.

Figure 2:
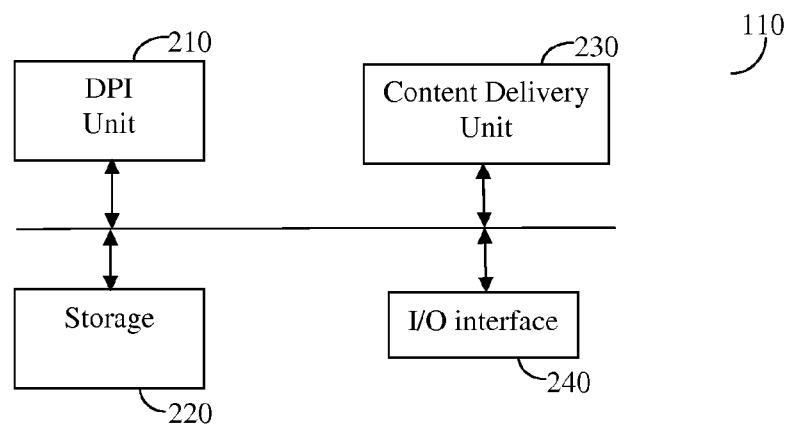
FIG. 2 is a block diagram of an exemplary apparatus to identify content sources and provide content from the apparatus in accordance with the certain aspects of the disclosed teachings.

FIG. 2 provides an exemplary and non-limiting block diagram of the SDA 110 that identifies content sources and provides content from the apparatus in accordance with the disclosed teachings. The SDA 110 comprises a DPI unit 210, a storage 220, a content delivery unit (CDU) 230 and an input/output interface 240. According to the disclosed teachings, the DPI unit 210 has two separate tasks. The first task is to identify sources of content that potentially contain data that may be worthwhile to store in storage 220. For example, video servers may be located throughout the global network 120 and accessed by UNs 150 of the service provider network 130, randomly by UNs 150. In order to overcome the deficiencies of related art solutions the apparatus 110 is implemented differently. The DPI unit 210 is provided with data types to look for in data packets that are transmitted through the apparatus 110. Instead of inspecting each and every packet DPI unit 210 may inspect only one in a certain number of (for example, one-in-a-thousand packets) out of the entire traffic thereby significantly lowering the processing load. It should be understood that the method for selecting the sampled packets is typically not performed by using a simple counter to process one out of every predetermined number of packets. Instead the source and destination addresses from each packet are fed into a hash function, and the hash function result is compared to a configurable threshold, and the result of this comparison determines if the packet is inspected or not. In addition, it should be understood that the hash function is symmetric with respect to the source/destination addresses, such that swapping the source address and the destination address does not change the hash result. In one non-limiting embodiment of the invention source/destination protocol ports, such as transmission control protocol (TCP) ports, may also be used as part of the hash function operation. This is needed to guarantee that each flow comprising of multiple packets sent between a UN 150 and a CS 140 is either fully ignored or fully inspected. Upon determination that a specific CS 140 provides a desired data type, the identification of that CS 140 is stored. Any future packet received from or sent to the identified CS 140 is inspected by the DPI unit 210 and if the packet contains content that may be interesting for storage, such as video content, such content is stored in the storage 220. This kind of inspection ensures that demand for highly popular content from a popular CS 140 is likely to be quickly detected while infrequent access to a CS 140 would typically not impact the traditional operation of the system. It should be noted that identification of a CS 140 does not have to be on the first detection of data of interest and threshold levels may be used, as well as an aging mechanism so that relatively infrequently accessed CSs 140 would lose older accesses so as to prevent impacting a threshold value.

While DPI unit 210 operates on the packets that arrive from CSs 140, the CDU 230 operates with respect to requests for content received from the UNs 150 of the service provider network 130. Upon receipt of such a request, the DPI 210 first checks if content from the requested CS 140 actually resides in the storage 220 by first checking that the CS 140 identification is known to the apparatus 110. If that is the case then the storage 220 is checked for the possibility of delivery of the content or portions thereof. If the entire content or portions thereof are found, then these are delivered to the requesting UN 150. If the entire content is missing, or certain portions thereof are missing, then the request is forwarded to the appropriate CS 140. Storage 220 may be semiconductor media, magnetic media, or any other type of storage media appropriate for the storage of content.

Figure 3:
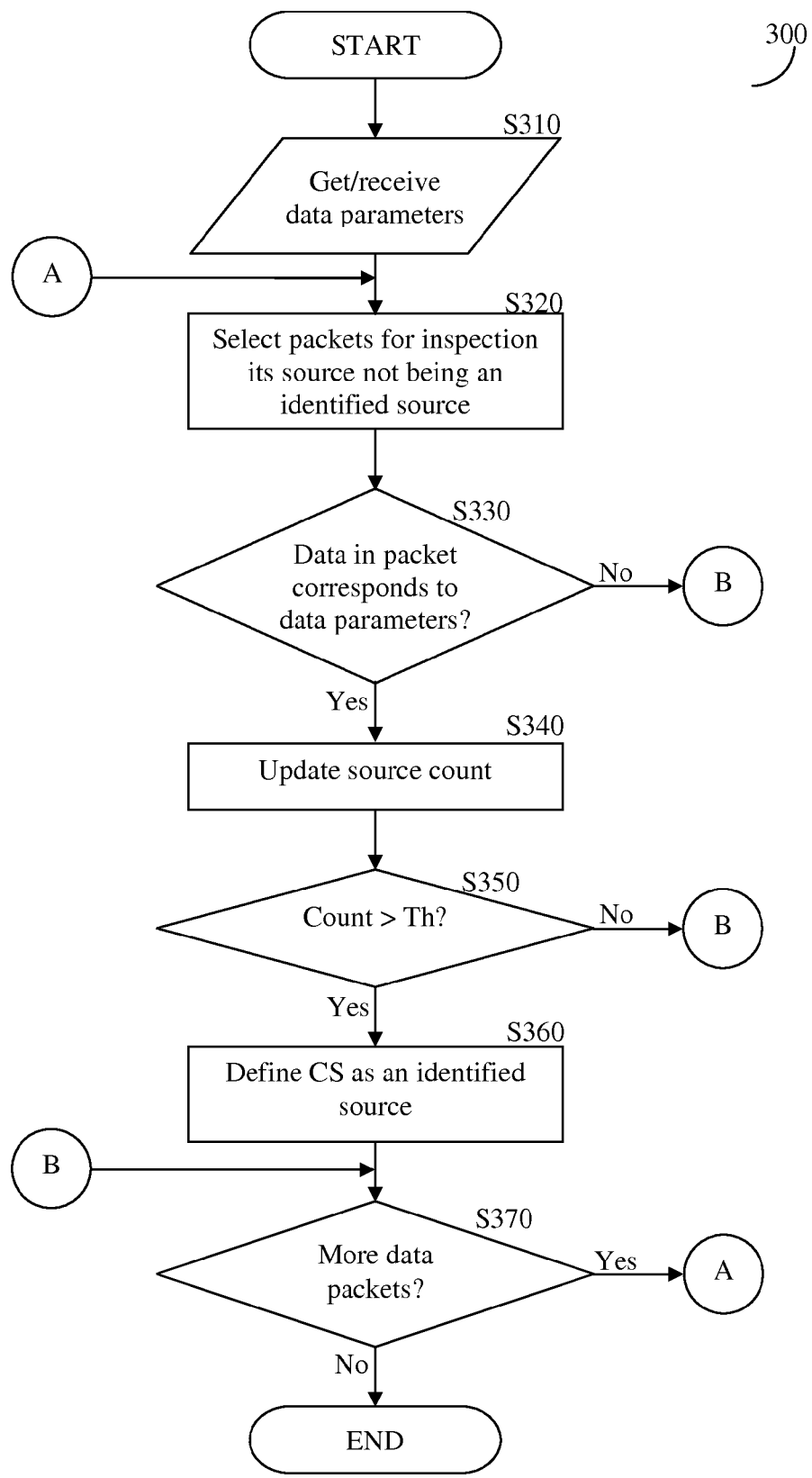
FIG. 3 is a flowchart depicting the identification of a content source in accordance with certain aspects of the disclosed teachings.

Reference is now made to FIG. 3 that depicts an exemplary and non-limiting flowchart 300 depicting the identification of a content source in accordance with aspects of the disclosed teachings. In S310 there are received and/or fetched parameters relating to the data of interest in the CSs. For example, it may contain parameters pertaining to video data. In S320, packets are selected off of the network traffic, for example the global network 120. The ratio between the number of packets that pass through the network and the number inspected may be configured, so it could be one-in-a-thousand, one-in-ten-thousand, and so on and so forth. In S330, it is checked if the data in the packet corresponds to the data parameters, e.g., if it contains video data, and if so execution continues with S340; otherwise, execution continues with S370. In S340, the count with respect to the CS 140 that is the source of the packet is updated, for example but not by way of limitation, by incrementing the value of a counter. In S350, it is checked if the count for that CS 140 has exceeded a threshold value and if so execution continues with S360; otherwise, execution continues with S370. In one implementation, the count may also have an aging mechanism (not shown). Furthermore, different data types may have different thresholds, different count increases, and different count aging. In S360 the CS 140 is identified as a source of content eligible for storage in storage, for example, storage 220. In S370, it is checked if there are more data packets to be inspected and if so, execution continues with S320; otherwise execution terminates.

Figure 4:
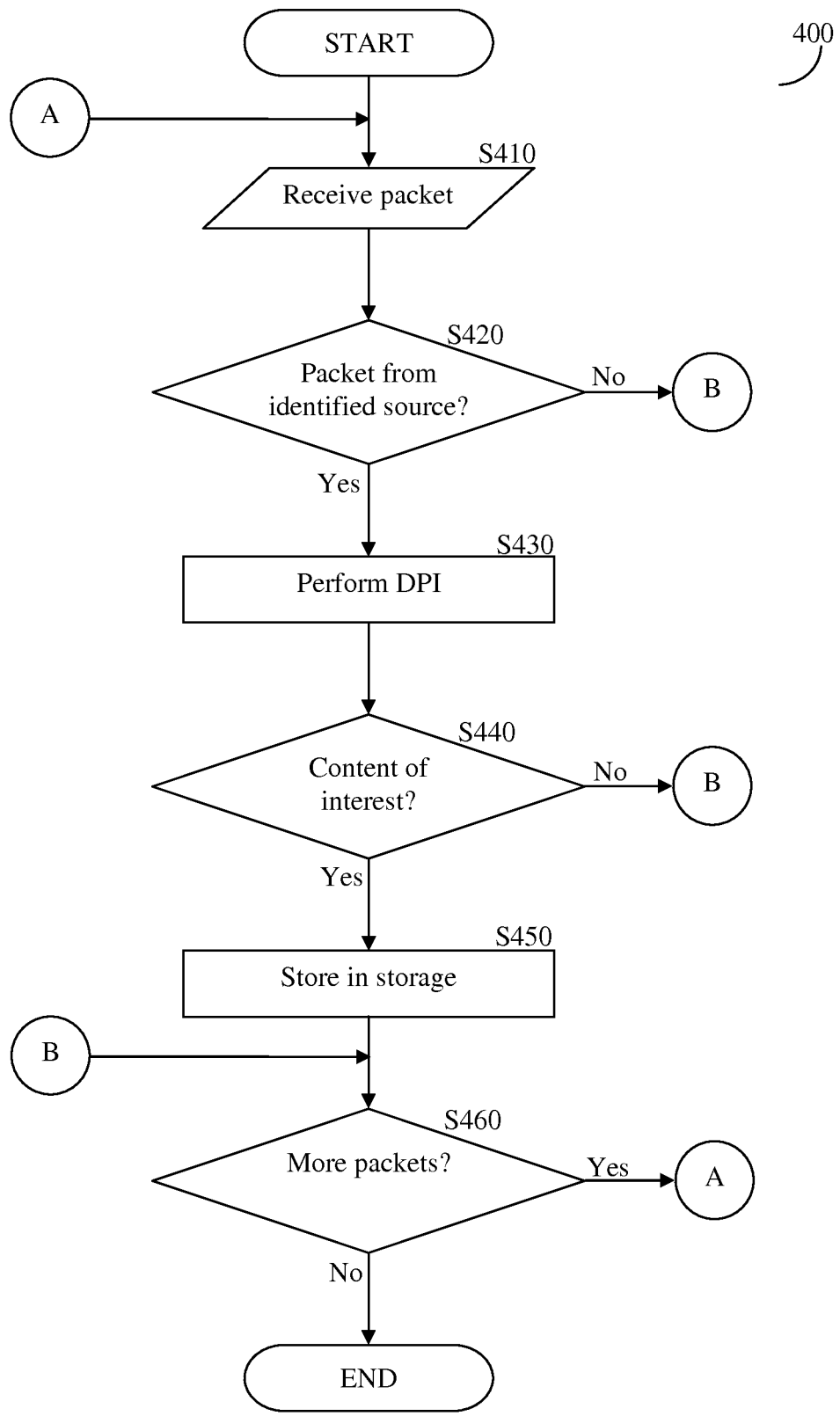
FIG. 4 is a flowchart depicting the storage of content from identified content sources in the storage of the exemplary apparatus.

Reference is now made to FIG. 4 that depicts an exemplary and non-limiting flowchart 400 depicting the storage of content from identified CS 140 in the storage 220 of the apparatus 110 according to aspects of the disclosed teachings. In S410, a packet is received by apparatus 110. In S420, it is checked whether the received packet is from an identified CS 140 and if so execution continues with S430; otherwise execution continues with S460. In S430, the received packet is inspected by the DPI unit 210 to identify content of interest. It should be understood that this takes place as it is possible that even though the packet arrived from an identified CS 140 it does not contain content of interest and therefore there is no need to waste valuable storage space in storage 220 for that data. In S440, it is checked whether such content of interest was found and if so execution continues with S450; otherwise, execution continues with S460. In S450 the content from the received packet is stored in storage, for example, storage 220. In S460 it is checked whether more packets are received and if so execution continues with S410; otherwise, execution terminates.

Figure 5:
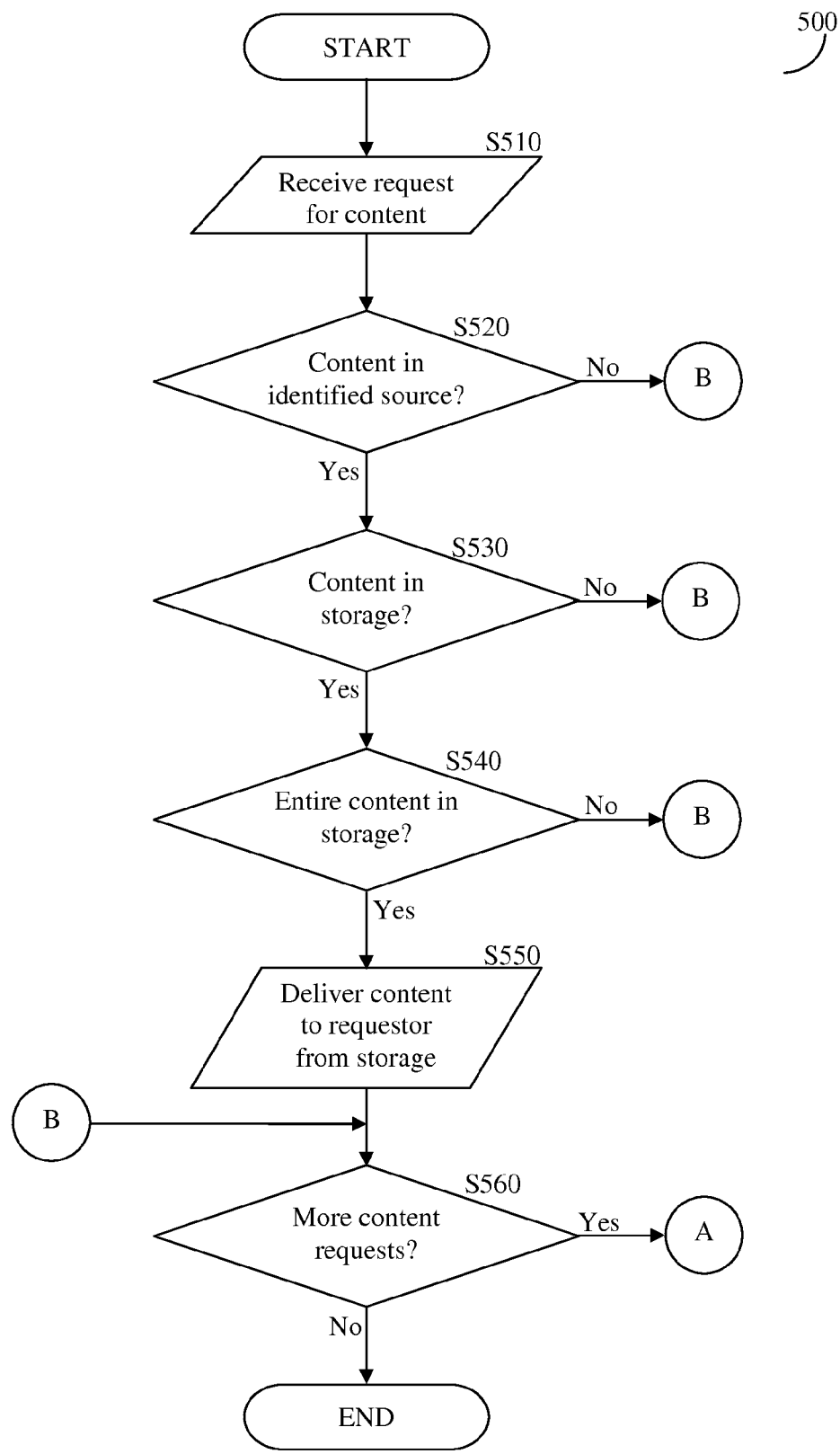
FIG. 5 is a flowchart describing the providing of content to a requesting node according to certain aspects of the disclosed teachings.

Reference is now made to FIG. 5 that depicts an exemplary and non-limiting flowchart 500 describing the providing of content to a requesting UN 150 according to aspects of the disclosed teachings. In S510, the apparatus 110 receives a request for content from a UN 150. In S520, it is checked if the requested content is in an identified CS 140 and if so execution continues with S530; otherwise, execution continues with S560. In S530, it is checked whether the content is in storage, for example storage 220, and if so execution continues with S540; otherwise, execution continues with S560. In S540 it is checked whether the entire requested content is in storage and if so execution continues from S550; otherwise, execution continues with S560. In S550, the content is delivered to the requesting UN 150. In S560, it is checked whether additional content requests exist and if so execution continues with S510; otherwise, execution terminates.

In some cases content requires authorization to be viewed and it is required that the SDA 110 adheres to such requirements even when it has a copy of the desired content stored therein. Typically, in the prior art, as part of the request and acknowledge exchange between the UN 150 and the CS 140, authorization is achieved by exchanging, for example, a hypertext transfer protocol (HTTP) protocol cookie and/or a data token also referred to as a token. Other means could be also used, for example and without limitation, the use of a random session identification (ID) in the universal resource locator (URL). According to a non-limiting embodiment the invention the transfer would take place through, or otherwise by data tapping, the SDA 110 and the UN 150 identifies itself periodically to the SDA 110 to ensure the content is delivered to the appropriate location. A problem may arise, however, if for some reason one UN 150, for example UN 150-2, gets a hold of a content identifier provided to UN 150-1. The SDA 110 would just start sending content to the UN 150-2 even though it is not in fact authorized to receive such content. Therefore, a solution is suggested where instead of using a content identifier for such verification, a data token, preferably a random ID, is generated by the SDA 110, the random ID being a string. The random ID is provided to the appropriate UN 150 uniquely, and the SDA 110 manages a table key that is associated with the random ID (also referred to by Applicants as a brownie or brownie ID) as well as additional parameters that may include, e.g., the content description, name or identifier, desired destination, start time of the delivery of content to the UN 150, segments provided to the UN 150, and expiration time. When a random ID is returned for validation purposes the SDA 110 checks that the random ID is returned from an expected destination, that it is for a non-expired data and so on, based on the parameters stored in the table, and thereby prevents providing the content to a destination that has erroneously or maliciously received the cookie and/or a token for the content. Even if for some reason the random ID is provided still, based on the stored parameters the SDA 110, and preferably the content delivery unit 230 therein, is enabled to distinguish a valid destination from an invalid destination for the content and avoid providing of content to an invalid destination. Specifically, the embodiment described hereinabove allows the SDA 110 to identify the case where an unauthorized UN attempts to request data from the SDA 110.

Figure 6:
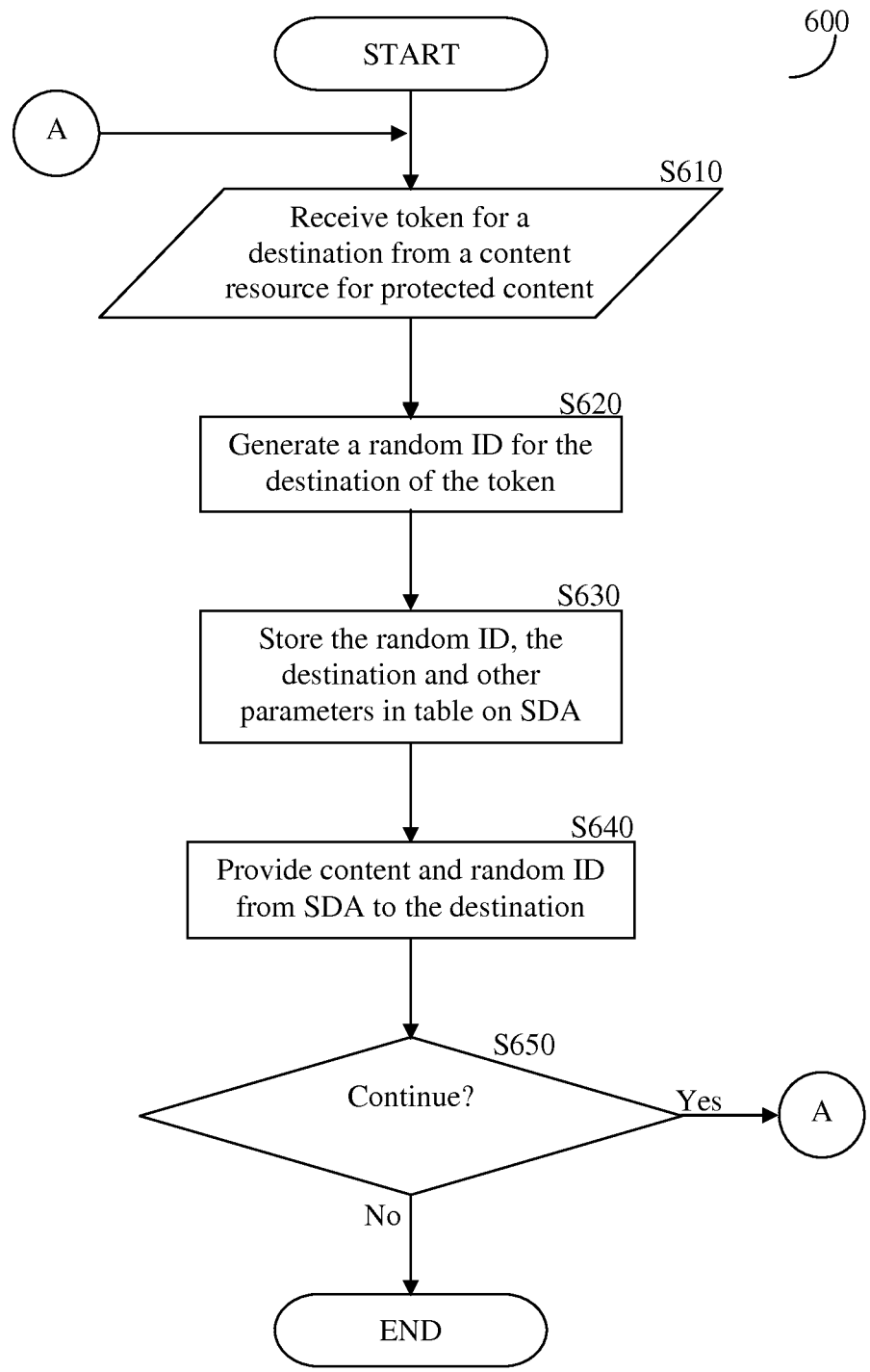
FIG. 6 is a flowchart describing the providing of a random identification (ID) responsive to a request for content that requires authentication using a verification mechanism.

Reference is now made to FIG. 6 depicting an exemplary and non-limiting flowchart 600 for providing of a random identification (ID) responsive to a request for content that requires authentication using a verification mechanism, according to an embodiment. In S610 a data token is received from a CS 140 from which a UN 150 requested content, where the requested content requires content access authorization. In S620 a random ID is generated by the SDA 110 specifically for the requesting UN 150 and associated content. In S630 the random ID and the client identification are stored in a table in the SDA 110. In a non-limiting embodiment of the invention additional parameters are stored in the table to enable more accurate identification of the destination and its authorization to receive protected content. As discussed earlier, such parameters may include, but are not limited to, a name respective to the content, an expiration time of the random ID, and a starting time for delivery of the content to the respective UN 150. In S640 at least the random ID is sent to the destination, i.e., a specific UN 150. In an embodiment the token is also sent by the SDA 110 to the destination. In S650 it is checked whether the method should continue and if so it continues with S610; otherwise, the method terminates.

Figure 7:
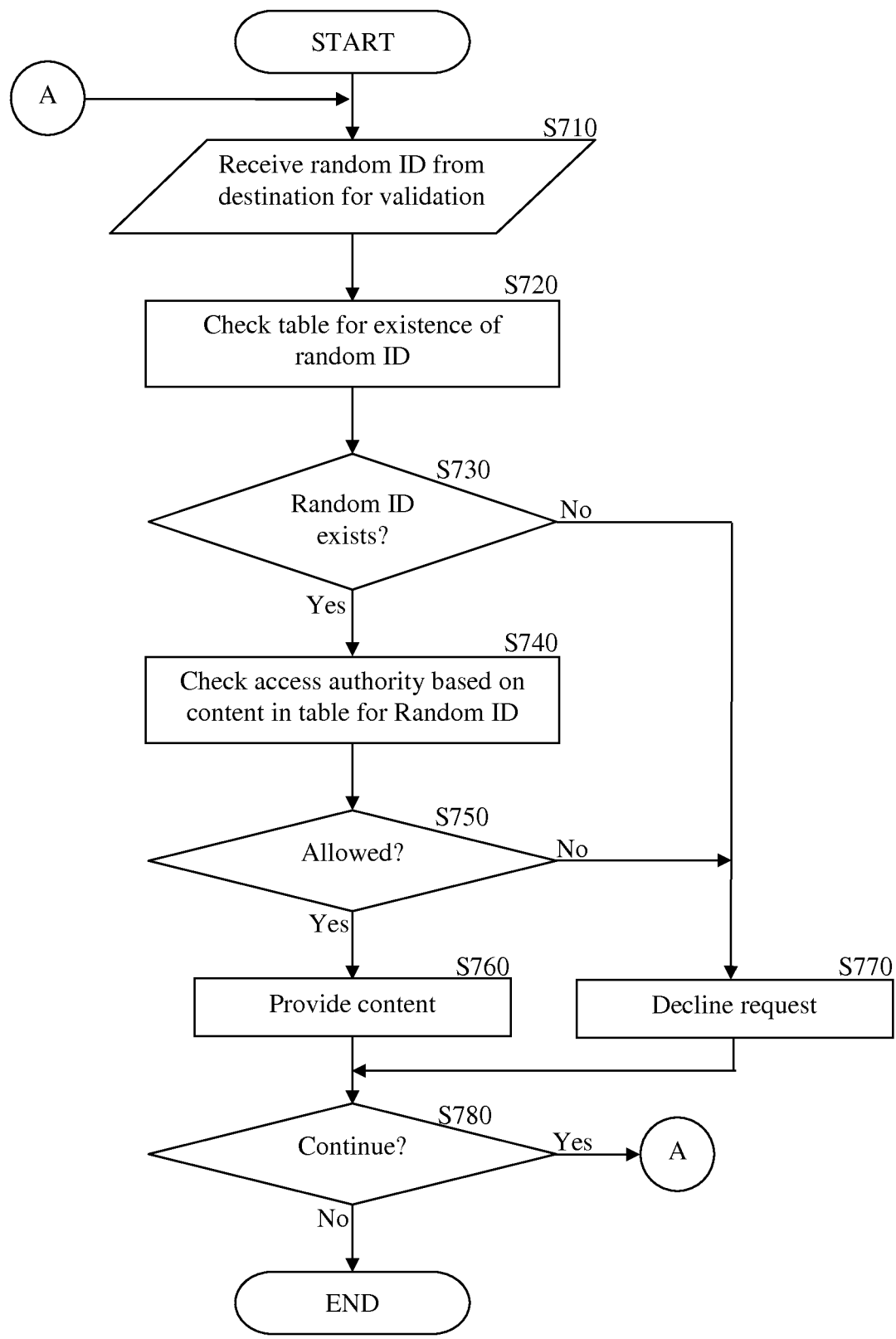
FIG. 7 is a flowchart describing the verification process responsive to receipt of a random ID from a destination for content.

Typically, the destination, i.e., a specific UN 150, is requested or initiates a validation process when additional content or segments thereof are requested. Reference is therefore now made to FIG. 7 where an exemplary and non-limiting flowchart 700 describes the verification process responsive to receipt of a random ID from a destination for content. In S710 the SDA 110 receives a random ID from the destination for the protected content. In S720 it is checked whether such a random ID actually exists in the table stored within the SDA 110, as described in greater detail with respect to FIG. 6 hereinabove. In S730 if the random ID exists then execution continues with S740; otherwise, execution continues with S770. In S740 it is checked whether content may be accessed for the destination identifying itself with the random ID based on parameters associated with the random ID and stored in the table. In S750 if it is determined that access is allowed then execution continues with S760 where content is caused to continue to be provided; otherwise, execution continues with S770 where the request for receipt of the protected content is declined. In one embodiment the requesting UN 150 is sent to resolve the issue with the respective CS 140. In S780 it is checked whether the method should continue and if so execution continues with S710; otherwise, execution terminates. In a non-limiting embodiment of the invention, in S760, the table stored at and managed by the SDA 110 is updated—the update may include adding details to the table in order to make the verification process more accurate. For example, in some cases, a client IP address is received by the SDA 110 from the requesting UN 150 and this received client IP address is stored in the table in association with the entry for the subject UN 150. Any other request verifies that the client IP address matches the respective IP address in the table.

In one embodiment of the invention an expiration time is provided as part of an entry of a random ID. Such an expiration time is periodically checked and if the time has expired, that random ID is invalidated, for example, by its removal from the table. Thereupon, if a destination desires to access such content again, a new cookie and/or token or random ID, i.e., a new authorization process with the CS 140 must take place in order to validate the eligibility of such destination to receive such protected content. Furthermore, in one embodiment the expiration time is continuously updated, or otherwise extended, for as long as the authorized destination continues to request content from the SDA 110.

In one alternate implementation, when detecting that a portion of the requested content is in the storage 220 and deliverable to the requesting UN 150, such content is delivered immediately to the UN 150 while only the missing portions of the content is requested from the CS 140. Hence a request from the CDU 230 may be for the requested content or portions thereof. It should be further understood that in a typical implementation, once the DPI unit 210 determines that a CS 140 may contain content that should be stored in storage 220, the packets from such a CS 140 are consistently inspected for determination of popular content.

The disclosed teachings are implemented as hardware, firmware, software, or any combination thereof. Moreover, the software is preferably implemented as an application program tangibly embodied on a program storage unit or non-transitory computer readable medium or a non-transitory machine-readable storage medium that can be in a form of a digital circuit, an analogy circuit, a magnetic medium, or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of non-limiting embodiments of the invention and the concepts contributed by the inventor to furthering the art, and are to be construed as being without limitation to such specifically recited examples and conditions. Moreover, all statements herein reciting principles, aspects, and non-limiting embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. An apparatus comprising:
a network interface;
a deep-packet-inspection (DPI) unit communicatively connected to the network interface for receiving one or more packets, the DPI unit configured to: identify at least a source of content from a plurality of sources communicatively connected to the apparatus via a network connected to the apparatus that contains content useful for storage in the apparatus; and, inspect the one or more packets provided from the identified at least a source of content; wherein each packet has at least a specific source address and a specific destination address;
a storage unit for storing at least a portion of the content from the identified at least a source of content for a predetermined time period, the storage unit communicatively connected to the DPI unit and the network interface;
a content delivery unit communicatively connected to the DPI unit, the storage unit and the network interface, the content delivery unit configured to: identify a request from a client node communicatively connected to the network interface for content from the identified at least a source of content; determine whether the content requires an access authorization by the identified at least a source of content, receive an authorization from the at least a source of content; generate a random identification (ID) associated uniquely with the client; for allowing the client access to content of the at least a source of content stored in the storage unit requiring access authorization responsive of each request for content from the at least a source content by accompanying the each request with the random ID; provide at least the random ID to the client; and, store in a table the random ID and at least another parameter associated with the random ID.

2. The apparatus of claim 1, wherein the apparatus uses the network interface to connect to a network in one of: a 'bump-in-the-wire' mode and a sniffing mode.

3. The apparatus of claim 2, wherein the apparatus provides data from the storage unit to the client node from a dedicated network port.

4. The apparatus of claim 1, wherein the parameters associated with the random ID are at least one of: an identifier of the content, a name of the content, a description of the content, an expiration time, a start time, a received token, and a client identifier.

5. The apparatus of claim 4, wherein the expiration time is periodically checked by the content delivery unit and when the expiration time has elapsed, the content delivery unit removes from the table an entry associated with the random ID having an expired time.

6. The apparatus of claim 4, wherein the expiration time is periodically extended in response to continued requests from the client node for content from the identified at least a source of content.

7. The apparatus of claim 1, wherein the content is one of: a video stream, a video clip, an audio stream, an audio clip, a video frame, combinations thereof, and any portion thereof.

8. The apparatus of claim 1, wherein the content delivery unit, responsive to receiving the client random ID from the client node verifies that the client random ID exists in the table and if the client random ID does not exist in the table, the content delivery unit declines to provide content from the apparatus to the client node.

9. The apparatus of claim 8, wherein the content delivery unit, upon validating the existence of the client random ID in the table, validates at least one parameter associated with the random ID, and upon failure to pass validation of the at least one parameter, declines to provide content from the apparatus to the client node.

10. A method for an efficient usage of network bandwidth comprising:
identifying at least a content source from a plurality of sources to deliver content useful for storage over a network and inspecting packets provided from the identified at least a content source delivered to a network interface, each packet having at least a specific source address and a specific destination address;
storing in a storage at least popular content of the content delivered over the network received from the identified at least a content source;
receiving a request from a client over the network interface for certain content from the identified at least a content source;
determining whether the client is authorized to receive the certain content and in response to determining that the client is authorized to receive the certain content, receiving an authorization from the identified at least a content source;
generating a random identification (ID) for the client, for allowing the client access to content of the at least a source of content stored in the storage unit requiring access authorization responsive of each request for content from the at least a source content by accompanying the each request with the random ID, and providing the random ID and the certain content, or portions of the certain content, from the storage over the network if the certain content, or portions of the certain content, if stored in the storage, or otherwise sending a request over the network to the identified at least a content source for the certain content, or missing portions of the certain content; and
storing in a table in a memory the random ID, an identifier of the client and at least a parameter associated with the random ID.

11. The method of claim 10, wherein the associated at least a parameter is one of: an identifier of the content, a name of the content, a description of the content, an expiration time, a start time, and a received token.

12. The method of claim 11, wherein the expiration time is periodically checked and when the expiration time has elapsed, an entry associated with the random ID having an expired time is removed from the table.

13. The method of claim 11, wherein the expiration time is periodically extended in response to continued requests from the client for content from the identified at least a source of content.

14. The method of claim 10, wherein the content is one of: a video stream, a video clip, an audio stream, an audio clip, a video frame, combinations thereof, and portions thereof.

15. The method of claim 10, further comprising:
receiving the random ID from the client;
verifying that the random ID exists in the table; and
declining to provide content to the client if it is determined that the random ID does not exist in the table.

16. The method of claim 15, further comprising:
   validating at least one parameter associated with the random ID; and
   declining to provide content to the client upon failure of the validation of the at least one parameter.

* * * * *